United States Patent
Zhou et al.

(10) Patent No.: US 6,405,268 B1
(45) Date of Patent: Jun. 11, 2002

(54) DYNAMIC BLOCK PROCESSING IN A HOST SIGNAL PROCESSING MODEM

(75) Inventors: Di Zhou; Long Wang, both of San Jose; Thomas K. Paul, Santa Clara, all of CA (US)

(73) Assignee: PC-Tel, Inc., San Jose, CA (US)

( * ) Notice: Subject to any disclaimer, the term of this patent is extended or adjusted under 35 U.S.C. 154(b) by 0 days.

(21) Appl. No.: 09/385,919

(22) Filed: Aug. 30, 1999

(51) Int. Cl.⁷ .......................... G06F 13/14; G06F 13/32
(52) U.S. Cl. ............................. 710/48; 710/34; 710/33; 710/52; 710/60; 710/260; 710/266
(58) Field of Search ............................. 710/33, 34, 52, 710/60, 48, 260, 266

(56) References Cited

U.S. PATENT DOCUMENTS

| | | | |
|---|---|---|---|
| 5,301,312 A | * | 4/1994 | Christopher, Jr. et al. .. 395/575 |
| 5,892,980 A | * | 4/1999 | Tal et al. ..................... 395/876 |
| 5,901,309 A | * | 5/1999 | Hammer et al. ............. 395/591 |

* cited by examiner

*Primary Examiner*—Jeffrey Gaffin
*Assistant Examiner*—Rehana Perveen
(74) *Attorney, Agent, or Firm*—Skjerven Morrill LLP; Philip W. Woo

(57) ABSTRACT

A host signal processing (HSP) modem or transceiver includes a transmit buffer and a receive buffer. The transmit buffer stores multiple blocks of information representing a transmit signal, and the receive buffer includes available space for multiple blocks of information representing a receive signal. Each block of information corresponds to its respective signal for an associated period that spans the time between consecutive interrupts for the HSP modem. When the host computer fails to service one or more interrupts, the hardware portion of the HSP modem uses the reserve of information from the transmit buffer to generate the transmit signal and stores one or more blocks of information representing the receive signal in the receive buffer. Accordingly, the HSP mode maintains the connection and data throughput even when the host computer misses interrupts. When the host computer services an interrupt, the modem software determines the number of interrupts missed and then dynamically selects the amount of data to process in an attempt to fill the transmit buffer and empty the receive buffer. The amount of information that the modem software processes in response to a single interrupt can be limited so that the transmit buffer is filled and the receive buffer is emptied over a series of serviced interrupts.

19 Claims, 2 Drawing Sheets

DYNAMIC BLOCK PROCESSING IN A HOST SIGNAL PROCESSING MODEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

This invention relates to host signal processing modems and to methods for information transfers between hardware and interrupt-driven software in computer systems that can miss servicing interrupts.

2. Description of Related Art

A conventional host signal processing (HSP) modem includes dedicated modem hardware that connects to telephone lines and software that the central processor of a host computer executes. The modem hardware receives an analog signal (Rx signal) in compliance with a modem protocol such as v.34 or v.90 from the telephone lines, converts the receive signal into a series of digital samples (Rx samples), and passes the Rx samples to the host computer for processing. The modem hardware also receives digital samples (Tx samples) from the host computer, coverts the Tx samples into an analog signal (Tx signal) in compliance with the protocol, and transmits the Tx signal on the telephone lines. The modem software receives and processes the Rx samples to demodulate the Rx signal and thereby extract received data. The modem software also receives and processes data to be transmitted and generates the Tx samples, which represent the Tx signal.

Recently proposed HSP modems or transceivers include software that the host computer executes to perform only part of the modulation or demodulation required for computation intensive communication standards such as HDSL. Dedicated hardware also performs part of the modulation or demodulation to reduce the loading of the host computer's central processor. Co-owned U.S. patent application Ser. No. 09/263160, entitled "Hybrid Software/Hardware Discrete Multi-Tone Transceiver" describes such systems and is hereby incorporated by reference in its entirety. These HSP or hybrid communication systems instead of transferring samples between software and hardware, transfers information such as Fourier transform coefficients.

Both the conventional HSP modems and the hybrid transceivers require a mechanism for transferring information between hardware and software. One modem software architecture uses interrupt-driven routines. For example, a host signal processing modem 100 shown in FIG. 1 includes modem software 122 that a central processor 112 of a host computer 110 executes. Modem software 122 runs under an operating system 120 with applications and other software 124. Modem hardware 130 connects to a system bus 116 of host computer 110 and periodically generates an interrupt signal. Host computer 110 executes an interrupt routine of modem software 122 to service an interrupt from modem hardware 130. The interrupt routine reads a block of Rx samples, processes the Rx samples to extract data, and passes the data to appropriate client. The interrupt routine also checks for data to be transmitted, generates a block of Tx samples representing a portion of the Tx signal, and outputs the Tx samples. Typically, the transfers of Tx and Rx samples are between a buffer in main memory 114 of host computer 110 and a buffer in modem hardware 130. Such transfers can be via DMA transfers or by modem software 122 directly reading from or writing to modem hardware 130 via bus 116. During each period between consecutive interrupts, modem hardware 130 generates the Tx signal based on the block of Tx samples from modem software 122 and accumulates another block of Rx samples from the Rx signal.

A problem can arise when applications or other software 124 stop host computer 110 from servicing of an interrupt from HSP modem hardware 130. When host computer 110 fails to service one or more interrupts, HSP modem hardware 130 can run out of Tx samples to convert. As a result, HSP modem hardware 130 may fail to maintain a Tx signal adequate for the connection on telephone lines 140. Accordingly, a remote device may disconnect. U.S. Pat. No. 5,721,830 and U.S. patent application Ser. No. 09/010,813 describe methods for using circular buffers in modem hardware 130 or main memory 114 to maintain the Tx signal and are hereby incorporated by reference herein in their entirety. The size of the circular buffers can be selected to maintain continuity of the Tx signal from modem hardware 130 so that the remote device does not disconnect. However, during the missed interrupt, modem software 122 does not process the Rx samples, and received data can be lost as samples are overwritten. When host computer 110 resumes servicing the interrupts for the HSP modem, modem software 122 typically must request a re-transmission of the lost data and often must handle a retrain operation. This reduces the data throughput of the HSP modem. Accordingly, an HSP modem architecture is desired that avoids a disconnect or retraining and maintains data throughput even when a host computer fails to service one or more interrupts.

SUMMARY

In accordance with an aspect of the invention, a DMA engine continuously transfers data/information between a host computer's main memory and dedicated modem hardware. The DMA transfers continue even during missed interrupt service. To take advantage of this feature of the DMA engine, modem software fills a large buffer with a reserve of previously generated information representing the transmit signal. Thus, when the host computer skips interrupt service, the DMA engine transfers information from the reserve in the buffer, and modem hardware continues to maintain the transmit signal. The buffer also contains space for received data that the DMA transfers may store in the buffer during missed interrupts. To maintain the buffer in condition to handle future missed interrupts, the modem software, during each serviced interrupt, dynamically determines the amount of data from the buffer to process and the amount of new data to generate.

In an exemplary embodiment of the invention, the HSP modem sets up a transmit buffer in the host computer's main memory, for DMA transfers from the main memory to modem hardware. The transmit buffer contains N blocks, where one block is the amount of memory required to hold the information representing the transmit signal during one interrupt period. A DMA transfer pointer points to a block in the transmit buffer that contains the information, for example, Tx samples, for the transmit signal during the current interrupt period. A write pointer indicates a second block where the modem software next writes information, and the modem software attempts to maintain about one block of separation is between the DMA transfer pointer and the write pointer. The remaining N−2 blocks in the buffer contain additional information that the DMA engine transfers to the modem hardware during the next N−2 interrupt periods. With the additional data in the transmit buffer, the HSP modem can handle up to N−2 missed interrupts without affecting the transmit signal.

Similarly, a receive buffer in the main memory is dedicated for DMA transfers from the modem hardware to the main memory. The receive buffer contains N blocks, where each block is the amount of memory required to hold the information, for example, Rx samples, received during one interrupt period. Of the N blocks, one block is for the Rx samples to be received during the current interrupt period, and one block contains the data that the modem software should process during the current interrupt period. During normal operations, the remaining N−2 blocks are available for additional received information, and the HSP modem can handle up to N−2 missed interrupts without overwriting or losing received information.

When executed, the modem software determines the number M of missed interrupts. This information can be obtained from the position of the DMA transfer pointer during each interrupt service routine. If the DMA transfer pointer moves one block between consecutive interrupt service routine calls, no interrupts have been missed (M=0). If the DMA transfer pointer moved two blocks, one interrupt was missed (M=1). Similarly, the modem software detects up to N−2 missed interrupts (M=N−2), corresponding to the DMA transfer pointer moving N−1 blocks. To prevent a subsequent missed interrupt from disrupting the transmit signal, the modem software generates more than one block of Tx samples when the interrupt routine detects a previous missed interrupt. In one embodiment of the invention, the modem software generates M+1 blocks of data during an interrupt period to ensure that the transmit buffer is full. Also, to prevent loss of received data, the missed interrupt count M specifies the number of additional blocks of received data that the modem software processes in response to an interrupt. This empties the receive buffer.

Another embodiment of the invention sets a limit K to restrict the number of blocks handled in any given execution of the interrupt service routine. This limits the maximum CPU loading of the HSP modem during any particular interrupt period. The next execution of the interrupt service routine can handle any additional missed interrupts subject to the same restriction that no more than K blocks be processed or generated in a single interrupt period. This process has the benefit of allowing a larger value for N than the host CPU could support if the host CPU was required to process N−1 Rx blocks and generate N−1 Tx blocks.

One embodiment of the invention is a host signal processing modem that includes an interrupt routine. The interrupt routine includes: a first portion that when executed determines a number M of interrupts that a host computer failed to service for the host signal processing modem; and a second portion that determines from the number M an amount of data to process in response to a current interrupt. The host signal processing modem can use a transmit and/or a receive buffer that includes N blocks in the host computer's main memory. The number N of blocks is greater than two, and each block stores the information for a transmit or receive signal over an interrupt interval.

A process in accordance with an embodiment of the invention includes transferring information between a buffer in a host computer and a hardware portion of a host signal processing modem and executing an interrupt routine in the host computer in response to an interrupt signal. The interrupt routine determines a number M of previous interrupts that the host computer failed to service; selects an amount of information according to the number M of previous unserviced interrupts; and processes the selected amount of information. The processing of the information includes, for example, decoding samples of a receive signal or generating samples of a transmit signal.

BRIEF DESCRIPTION OF THE DRAWINGS

Use of the same reference symbols in different figures indicates similar or identical items.

DETAILED DESCRIPTION

A host signal processing (HSP) modem or transceiver maintains receive (Rx) and transmit (Tx) buffers including multiple Rx and Tx blocks. Each Rx block holds the information received from an Rx signal during the period between consecutive interrupts for the modem, and each Tx block holds the information necessary to maintain a Tx signal for the period between consecutive interrupts. When executed in response to an interrupt, the modem software attempts to empty the receive buffer and fill the transmit buffer. Accordingly, the modem software dynamically determines the number of Rx blocks to process and the number of Tx blocks to generate. In a steady state with no recent skipped interrupts, the modem software processes one Rx block and generates one Tx block. The transmit buffer contains multiple valid Tx blocks, and the receive buffer contains empty space for multiple Rx blocks in the steady state. During each interrupt period, the modem hardware generates one Rx block from the Rx signal and uses the oldest Tx block from the transmit buffer to generate the transmit signal. If the host computer fails to service an interrupt, the modem hardware uses the next Tx block from the transmit buffer, generates another Rx block, and stores the newly generated Rx block in empty space available in the receive buffer.

Figure 1:
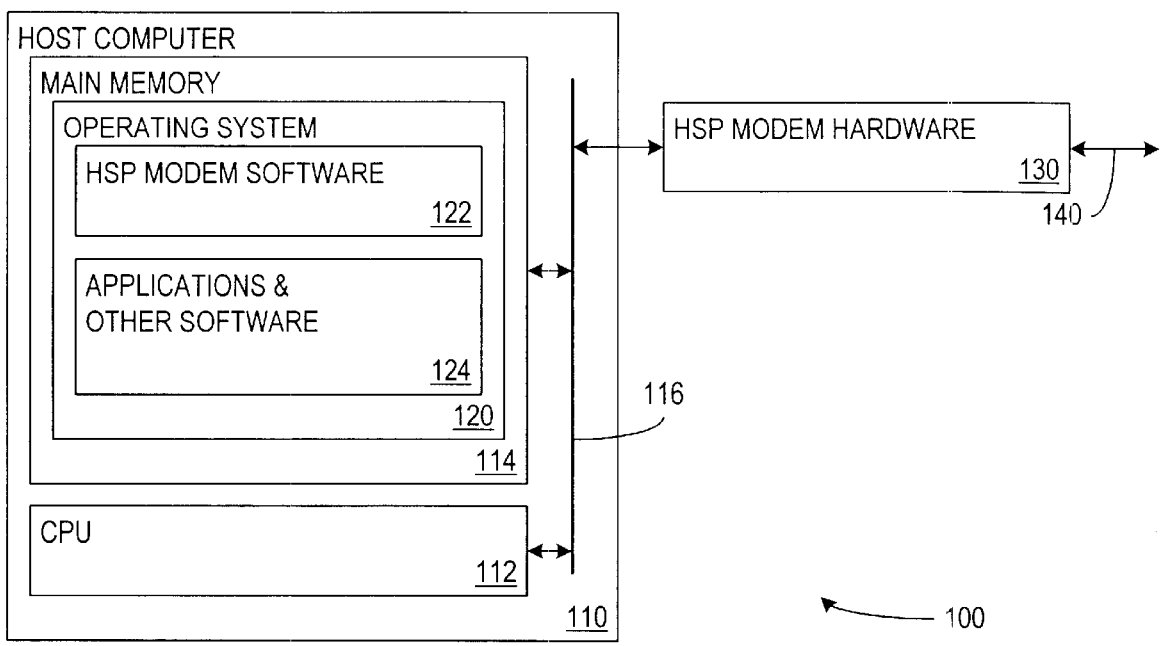
FIG. 1 is a block diagram of a computer system including a conventional host signal processing modem.
Figure 2:
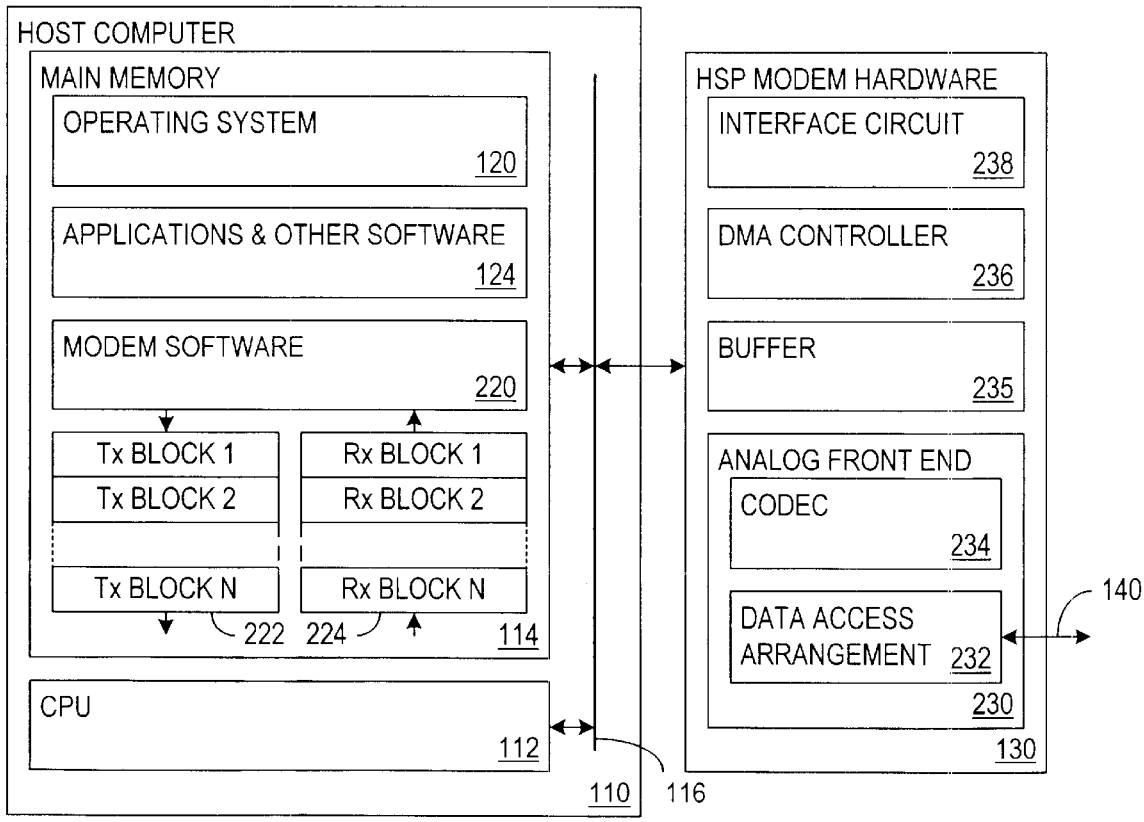
FIG. 2 is a block diagram of a computer system including a host signal processing modem in accordance with an embodiment of the invention.

FIG. 2 shows a computer system 200 that implements a host signal processing modem in accordance with an embodiment of the invention. Computer system 200 includes modem hardware 130 and a host computer 110 that executes modem software 220. Host computer 110 includes a central processor (CPU) 112 and a main memory 114 and has a device bus 116 for external devices such as modem hardware 130. In an exemplary embodiment of the invention, host computer 110 is an industry standard personal computer, device bus 116 is a PCI bus 116, and CPU 112 is an x86-type processor such available from Intel, Inc. or Advance MicroDevices, Inc. In operation, host computer 110 executes an operating system 120 such as one of the Windows series of operating systems available from Microsoft, Inc. Operating system 120 provides a multitasking operating environment for modem software 220 and applications and other software 124. Modem software 220 interacts with operating system 120 and applications and other software 124 in the same manner as a conventional modem. In the exemplary embodiment, modem software 220 is a driver that meets the requirements of the Windows operating system and further includes routines for decoding and encoding of data in accordance with a communication protocol such as v.34 that the HSP modem implements.

Modem hardware 130 connects to bus 116 and includes an interface circuit 238, a DMA controller 236, a buffer 235, and an analog front end (AFE) 230. Interface circuit 238 implements the required protocols for an interface to bus 116 and generates interrupt signals for operation of the HSP modem. DMA controller 236 controls direct memory access transfers of samples or other information between main memory 114 in host computer 110 and buffer 235 in modem hardware 130. Buffer 235 in modem hardware 130 can be a circular buffer such as described above-incorporate U.S. Pat. No. 5,721,830. AFE 230 includes a data access arrangement (DAA) 232 and a codec 234. DAA 232 connects to telephone lines 140, provides a Rx signal from lines 140 to codec 234, and outputs a Tx signal from codec 234 to lines 140. Codec 234 converts Tx samples from buffer 235 to the Tx signal and converts the Rx signal from DAA 232 to Rx samples stored in buffer 235.

In an exemplary embodiment of the invention, DMA controller 236 is a conventional DMA controller chip such as an Intel 810 or 820, a Via 686A, or a SiS 540 or 630. Buffer 235 is typically a component of the DMA controller chip. Interface 238 and AFE 230 are components of an integrated circuit such as a PCT301, available from PCtel, Inc.

In accordance with an aspect of the invention, the host signal processing modem includes a transmit buffer 222 and a receive buffer 224 in main memory 114. Each of buffers 222 and 224 contains sufficient storage for multiple blocks of data. For this embodiment of the invention, the data is Tx samples and Rx samples but other types of information can be used to represent the Tx and Rx signals. DMA controller 236 conducts steady transfers to and from buffers 224 and 222 at the average rate that samples of the Rx signal are taken and at the average rate required for conversion to the Tx signal. Each buffer 222 and 224 contains N blocks, where N is an integer greater than 2. Each block has the capacity to hold the number of samples used or generated during a single interrupt period.

During normal operation of the HSP modem, if host computer 110 has not recently skipped servicing any interrupts for the host signal processing modem, transmit buffer 222 includes: one block that contains the oldest Tx samples, which are the Tx samples subject to a current DMA transfer to modem hardware 130; one block that is available for modem software 220 to write samples in response to a serviced interrupt and concurrently with the DMA transfer, and N−2 blocks containing Tx samples that modem software 220 previously generated but that have not been transferred to modem hardware 130. Receive buffer 224 includes: one block subject to a current DMA transfer of samples from modem hardware 130; one block ready for modem software 220 to process in response to the next serviced interrupt; and N−2 empty blocks that are available for subsequent DMA transfer operations.

If host computer 110 does not service an interrupt for the HSP modem, modem software 220 does not generate a new block of Tx samples and does not process a block of Rx samples. However, modem hardware 130 continues to operate and begins a DMA transfer of the next block of Tx samples from transmit buffer 222 and begins a DMA transfer of the next block of Rx samples to receive buffer 224. Accordingly, after one skipped interrupt, transmit buffer 222 includes: one block that subject to a current DMA transfer to modem hardware 130; two blocks that are available for modem software 220 to write samples in response to subsequent serviced interrupts, and N−3 blocks containing Tx samples that modem software 220 previously generated but that have not been transferred to modem hardware 130. Modem hardware 130 maintains a valid Tx signal using the Tx samples from transmit buffer 222 even though host computer 110 missed servicing an interrupt.

After one missed interrupt, receive buffer 224 includes: one block subject to a current DMA transfer of samples from modem hardware 130; two blocks ready for modem software 220 to process; and N−3 empty blocks that are available for subsequent DMA transfer operations from modem hardware 130. Accordingly, the information represented in the Rx signal during the last interrupt interval is not lost event though the last interrupt was not serviced.

As noted above, in the steady state, transfer buffer 222 includes N−2 blocks of Tx samples waiting for transfer, and receive buffer includes N−2 empty block available to receive Rx samples. Accordingly, the HSP modem can continue to function even when the host processor fails to service N−2 consecutive interrupts.

During each serviced interrupt, modem software 220 determines the number of missed interrupts or equivalently the number of blocks in transfer buffer 222 that contain valid Tx samples or the number of empty blocks in receive buffer 224. From that determination and the available processing time, modem software 220 dynamically selects a number of blocks of Rx data to process and a number of Tx blocks to generate. For example, if the available processing time in the interrupt period permits, modem software 220 can generate up to N−1 blocks of Tx samples as necessary to fill all of the blocks in transmit buffer 222 except the block currently subject to a simultaneous DMA transfer. Modem software 220 can also process all of the available blocks Rx samples from receive buffer 224. Alternatively, if host computer 110 does not have sufficient available processing power to generate enough blocks of Tx samples to fill transmit buffer 222 and process all of the blocks of Rx samples in receive buffer 224, modem software 220 at least generates more than one block of Tx samples and/or processes more than one block of Rx samples so that over two or more serviced interrupts modem software 220 fills transmit buffer 222 and empties receive buffer 224.

In the above-described HSP modem, the amount of memory or number of blocks allocated for transmit buffer 222 controls a delay in transmitting data. When the transmit buffer contains N blocks, the HSP modem typically delays transferring data for N−1 interrupt intervals. A ranging portion of the modem handshake procedure for the V.90 protocol limits the transmit delay for proper estimation of the round trip delay. Other protocols may similarly limit response times during the handshake process. Accordingly, small data blocks, a short interrupt period, and a small buffer, can be used during the modem handshake process to provide a short response delay. However, the data mode generally does not restrict the transmit delay. Accordingly, the HSP modem and particularly, modem software 220 can change the number N and the size of blocks making up buffers 222 and 224, for example, using a small number of blocks during the modem handshake process and a larger number of blocks in the data mode. In an exemplary embodiment of the invention that implements the V.90 protocol, modem software 220 sets each of buffers 222 and 224 to contain three blocks of 24 samples during the handshake process, and modem hardware 130 generates the interrupt signal with a period of about 3.3 ms. During data mode, modem software 220 sets each of buffers 222 and 224 to contain up to six blocks of 120 samples, and modem hardware 130 generates the interrupt signal with a period of about 13 ms. The sample rates also change from about 7200 Hz in handshake mode to about 10287 in data mode.

The number of blocks used in transmit buffer 222 and receive buffer 224 can be selected according to the processing power of CPU 112. More powerful CPUs can process more blocks of information during an interrupt period. One embodiment of the invention restricts the number N of blocks in buffers 222 and 224 so that CPU 112 can process at least N−1 Tx blocks and N−1 Rx blocks during an interrupt period. This permits modem software 220 to fill transmit buffer 222 and empty receive buffer 224 in a single serviced interrupt even after the host computer skipped servicing N−2 consecutive interrupts.

Figure 3:
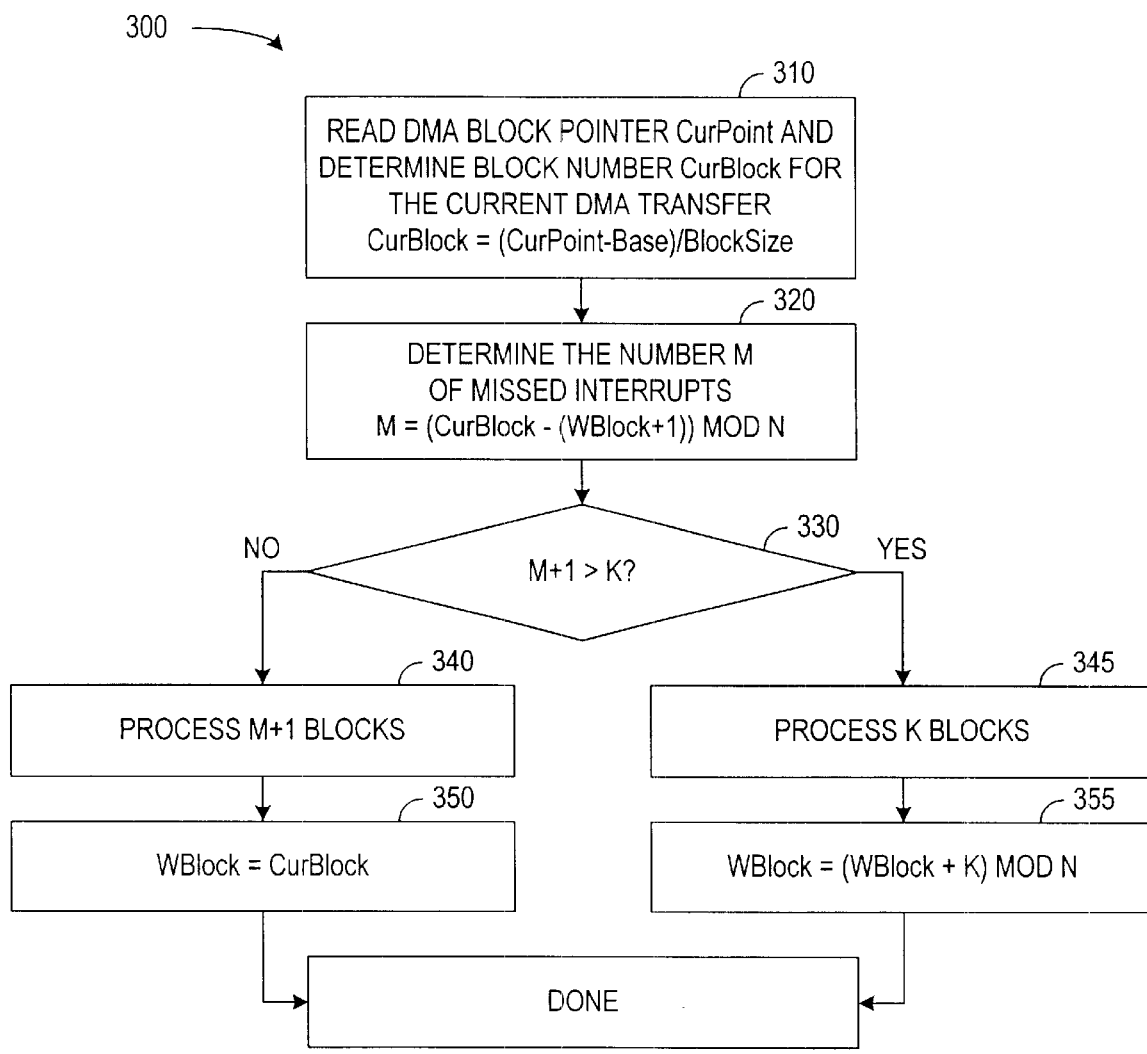
FIG. 3 is a flow diagram of a process in accordance with an embodiment of the invention that maintains data throughput when a host computer fails to service one or more interrupts.

FIG. 3 is a flow diagram of a portion of an interrupt routine 300 in an HSP modem in accordance with an embodiment of the invention. The host processor of a computer system executes interrupt routine 300 in response to an interrupt signal for the HSP modem. At its start 310, interrupt routine 300 reads the read pointer CurPoint for the DMA system and determines a block number CurBlock between 0 and N−1 for the block in transfer buffer 222 that is subject to a DMA transfer to modem hardware 130 during the current interrupt period. Routine 300 in step 320 then determines the number M of missed interrupts from the difference between the block number CurBlock for the current DMA transfer and a block number WBlock identifying the next block to which modem software 220 will write Tx samples. If there were no missed interrupts that have not been previously handled, the write block number WBlock should correspond to the block immediately preceding the block subject to a DMA transfer. The number of misses is the difference between CurBlock and WBlock+1 modulo the number of blocks in transmit buffer 222. Although process 300 determines the number of uncompensated-for, skipped interrupts based on pointers for transmit buffer 222, alternatively pointers for receive buffer 224 can be use for the same purpose.

To compensate for M missed interrupts and complete processing for the current interrupt period, modem software 220 must process M+1 blocks of Rx samples and generate M+1 blocks of Tx samples. A decision step 330, determines whether the required number (M+1) of blocks would be too great of a load on host processor 112 during the current interrupt period. In particular, step 330 compares the number M+1 to a limit K. Limit K can be determined from the available MIPs from host processor 112 for the HSP modem, and the known number of processor cycles required to process K blocks of Rx samples and generate K block of Tx samples. Modem software 220 can determine the available number of MIPs from the clock speed and type of host processor 112. Typically, modem software 220 would determine the limit K during a start-up procedure when the HSP modem is initialized. However, modem software 220 can dynamically determine limit K in the event that a user may want to limit the loading of host CPU 112 during a specific time.

If the available processing power of host CPU 112 permits modem software 220 to compensate for all of the missed interrupts during a single interrupt period, process 300 branches from step 330 to step 340. Step 340 processes M+1 blocks of Rx samples and generates M+1 blocks of Tx samples. Procedures for processing a block of Rx samples and a block of Tx samples are conventional for HSP modems and depend on the specific communication protocol implemented. In one embodiment of the invention, step 340 calls one or more subroutines M+1 times where each call of the one or more subroutines processes a block of Rx samples and generates a block of Tx samples. Alternatively, step 340 calls a modulation/demodulation procedure implementing the protocol and provides the value M+1 as a parameter for the procedure. Using the count M+1 as a parameter may allow improvements in the efficiency of the modulation/demodulation procedure depending on the protocol and whether repetitive steps can be avoided when processing multiple blocks. Step 340 writes M+1 blocks from the transmit buffer and reads M+1 blocks from the receive buffer. After completion of step 340 the block number WBlock of the next block to be written is updated to the current DMA block number CurBlock.

If the available processing power of host CPU 112 does not permits modem software 220 to compensate for all of the missed interrupts during a single interrupt period, process 300 branches from step 330 to step 345. Step 345 processes the maximum of K blocks of Rx samples and generates K blocks of Tx samples. Step 345 calls one or more subroutines K times where each time the one or more subroutines process a block of Rx samples and generate a block of Tx samples. Alternatively, step 345 calls the modulation/demodulation procedure and provides the value K as a parameter for the procedure. Step 345 writes K blocks from the transmit buffer and reads K blocks from the receive buffer. After completion of step 345, the block number WBlock of the next block to be written is increased by K. During the next serviced interrupt, write block number and current block number CurBlock will again differ by more than 1, and modem software 220 can further compensate for missed interrupts.

In the above process, the Rx and Tx data are handled symmetrically. Alternatively, an asymmetric approach can be employed. In particular, blocks of Rx or Tx samples can be preferentially handle. For example, if host processor 112 can not process M+1 blocks of Rx samples and generate M+1 blocks of Tx sample, modem software 220 can process the blocks of Rx samples to ensure that received data is not lost and ignore generation of Tx blocks during an interrupt period. To ensure that the transmit signal remains in compliance with the protocol and that the remote device does not disconnect, blocks of Tx samples can be generated while Rx blocks are ignored. Further, a simplified generation technique can be used to provide Tx samples that ensure an adequate transmit signal, but the simplified generation technique can provide a transmit signal that does not convey data. Such modifications of the process may be useful in applications where the available processing power is low or the frequency of skipped interrupts is high.

The Appendix contains a C programming language listing of a routine that implements another embodiment of the invention.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A process comprising:
   transferring information between a buffer in a host computer and a hardware portion of a host signal processing modem; and executing an interrupt routine in the host computer in response to an interrupt, wherein executing the interrupt routine comprises:
  determining a number M of previous interrupts that the host computer failed to service;
  selecting an amount of information according to the number M of previous interrupts;
  generating the selected amount of information, wherein the generated information represents a transmit signal of the host signal processing modem; and
  writing the generated information in the buffer.

2. The process of claim 1, wherein:
during each interrupt period, the transferring transfers from the buffer to the hardware portion a fixed amount of information referred to as a block; and
selecting the amount of information comprises:
  selecting M+1 blocks as the selected amount if the M+1 is less than or equal to a limit K; and
  selecting K blocks if M+1 blocks is more than the limit K.

3. The process of claim 2, further comprising determining the limit K from the processing power available from the host processor, for the host signal processing modem, during an interrupt period.

4. The process of claim 1, wherein transferring information comprises performing a series of DMA operations independent of the host computer servicing the interrupts.

5. The process of claim 4, wherein determining the number M comprises:
  reading a DMA pointer that indicates a first address for a current DMA operation;
  determining a difference between the first address and a second address, wherein the second address identifies a memory location for access by a software portion of the host signal processing modem; and
  determining the number M from the difference.

6. The process of claim 1, wherein:
the buffer contains N blocks;
N is an integer greater than 2; and
each block has a capacity to contain information that the transferring transfers to the hardware portion in a period between consecutive interrupts for the host signal processing modem.

7. A process comprising:
transferring information between a buffer in a host computer and a hardware portion of a host signal processing modem; and
executing an interrupt routine in the host computer in response to an interrupt, wherein executing the interrupt routine comprises:
  determining a number M of previous interrupts that the host computer failed to service;
  selecting an amount of information according to the number M of previous interrupts; and
  reading and processing the selected amount of information from the buffer.

8. The process of claim 7, wherein:
during each interrupt period, the transferring transfers from the buffer to the hardware portion a fixed amount of information referred to as a block; and
selecting the amount of information comprises:
  selecting M+1 blocks as the selected amount if the M+1 is less than or equal to a limit K; and
  selecting K blocks if M+1 is more than the limit K.

9. The process of claim 8, further comprising determining the limit K from the processing power available from the host processor, for the host signal processing modem, during an interrupt period.

10. The process of claim 7, wherein transferring information comprises performing a series of DMA operations independent of the host computer servicing the interrupts.

11. The process of claim 10, wherein determining the number M comprises:
  reading a DMA pointer that indicates a first address for a current DMA operation;
  determining a difference between the first address and a second address, wherein the second address identifies a memory location for access by a software portion of the host signal processing modem; and
  determining the number M from the difference.

12. The process of claim 7, wherein:
the buffer contains N blocks;
N is an integer greater than 2; and
each block has a capacity to contain information that the transferring transfers to the hardware portion in a period between consecutive interrupts for the host signal processing modem.

13. A host signal processing modem comprising an interrupt routine, wherein the interrupt routine includes:
  a first portion that determines a number M of interrupts that a host computer failed to service for the host signal processing modem; and
  a second portion that determines from the number M an amount of data to process in response to a current interrupt.

14. The host signal processing modem of claim 13, wherein processing the data comprises:
  generating M+1 blocks of data that represent a transmit signal if the M+1 is less than or equal to a limit K; and
  generating K blocks of data that represent the transmit signal if M+1 is more than the limit K, wherein
    each block of data contains information that represents the transmit signal during a period between consecutive interrupts for the host signal processing modem.

15. The host signal processing modem of claim 14, wherein processing the data further comprises:
  extracting received data from M+1 blocks of data that represent a receive signal if the M+1 is less than or equal to a limit K; and
  extracting received data from K blocks of data that represent the receive signal if M+1 is more than the limit K.

16. The host signal processing modem of claim 13, wherein processing the data comprises:
  extracting received data from M+1 blocks of data that represent a receive signal if the M+1 is less than or equal to a limit K; and
  extracting received data from K blocks of data that represent the receive signal if M+1 is more than the limit K, wherein
    each block of data contains information that represents the receive signal during a period between consecutive interrupts for the host signal processing modem.

17. The host signal processing modem of claim 13, further comprising:

a hardware portion; and a first software buffer containing N blocks for information transferred in a first direction between the first software buffer and the hardware portion, wherein:

each block has the capacity to contain information that represents a communication signal over a period between consecutive interrupts; and N is an integer greater than two.

18. The host signal processing modem of claim 17, wherein the first direction is from the first software buffer to the hardware portion, and the host signal processing modem further comprises a second software buffer containing N blocks for information transferred from the hardware portion to the second software buffer.

19. The host signal processing modem of claim 13, wherein the first portion when executed determines the number M by:

reading a DMA pointer that indicates a first address for a current DMA operation;

determining a difference between the first address and a second address, wherein the second address identifies a memory location for access by a software portion of the host signal processing modem; and determining the number M from the difference.

* * * * *